Figure 1:
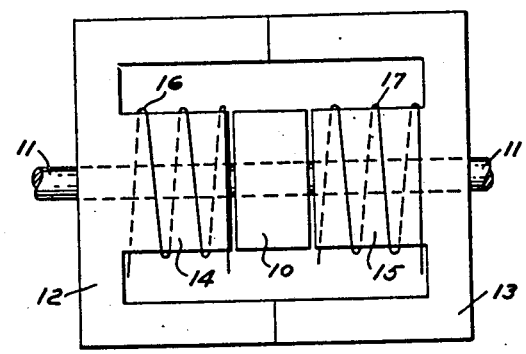

Nov. 4, 1958

D. W. ERICSON 2,859,391

FORCE MOTOR

Filed June 7, 1955

2 Sheets-Sheet 1

INVENTOR.
DONALD W. ERICSON
BY
Farley Forster + Farley
ATTORNEYS

Nov. 4, 1958      D. W. ERICSON      2,859,391
FORCE MOTOR
Filed June 7, 1955      2 Sheets-Sheet 2
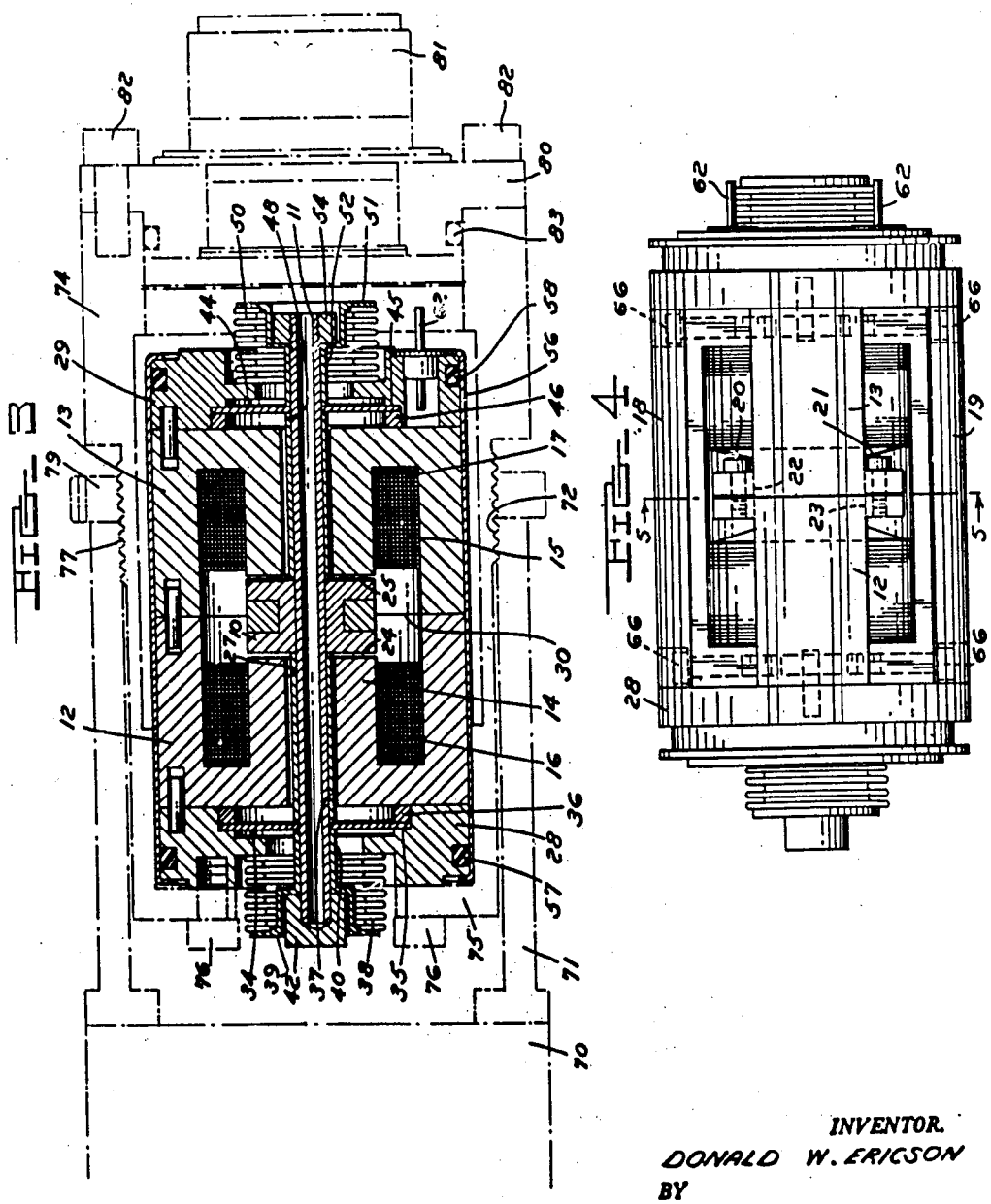
INVENTOR.
DONALD W. ERICSON
BY
Farley Forster & Farley
ATTORNEYS United States Patent Office 2,859,391
Patented Nov. 4, 1958

2,859,391
FORCE MOTOR
Donald W. Ericson, Oak Park, Mich.
Application June 7, 1955, Serial No. 513,697
17 Claims. (Cl. 317—171)

This invention relates to an improved construction for a "force motor," which term is employed to designate a device in which electrical energy is directly converted to linear motion.

One example of the utility of a force motor is in positioning of the spool of a hydraulic servo valve, the force motor being used as an element of an electronic controlling system and being adapted by its operating characteristics to convert an electrical signal into a desired spool position. The present invention will be illustrated in this field of use.

A force motor essentially consists of an armature mounted for linear movement in a frame structure which provides the magnetic circuits required for producing armature motion. For servo valve use, the type of armature motion characteristics desired are such as to produce a large force, with small armature stroke, high natural frequency, and with the amount of motion bearing substantially a straight-line relationship to the amount of control current.

These desirable characteristics are achieved in the force motor of the present invention by providing a structure having two spaced, opposed pole pieces extending in the direction of armature movement, and movably supporting the armature between such pole pieces. A quiescent flux of substantially constant density is impressed upon the armature from another pole piece, or preferably from a pair of pole pieces positioned laterally adjacent the armature and adjacent the gap between the first-mentioned pair of pole pieces. The magnetic circuit through which the quiescent flux flows includes the armature, the flux dividing equally between the pair of pole pieces which extend in the direction of armature movement and returning through a magnetic path of high incremental reluctance and low total reluctance. Means are included for producing a difference in flux between the armature and each of the pair of pole pieces in the direction of armature movement, and preferably this means consists in a coil wound about each of the pair of pole pieces and suitably connected to a source of control current. The magnetic circuit for this control flux includes a low reluctance return path between the pair of pole pieces.

This arrangement of the armature and magnetic circuits enables high flux densities to be obtained and therefore a large armature force to be produced by a small difference in flux between the two coils; and within small limits of armature travel, the amount of force on the armature is proportional to the amount of control current. The inclusion of spring means arranged to normally urge the armature to a centered position results in armature movement becoming substantially proportional to the control current.

Preferably the quiescent flux is supplied by the use of a permanent magnet which enables this flux to be imposed on the armature without the necessity of employing a constant exciting current. The use of a magnet also makes the quiescent flux value substantially free from variation resulting from changes in the amount of flux supplied by the control coils.

The present invention also contemplates improved features for a force motor assembly, including a spring system for suspending, centering and opposing armature movement, which permits all moving parts and electric circuits to be completely sealed against water, dirt, oil or any foreign matter; and a construction designed to facilitate the use of a force motor of this type in combination with hydraulic control valves of the spool type.

Figure 2:
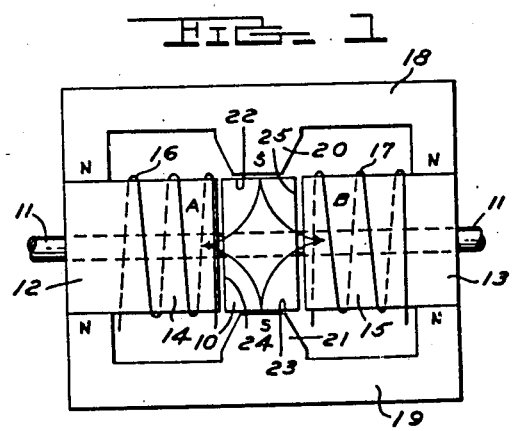
Figure 3:
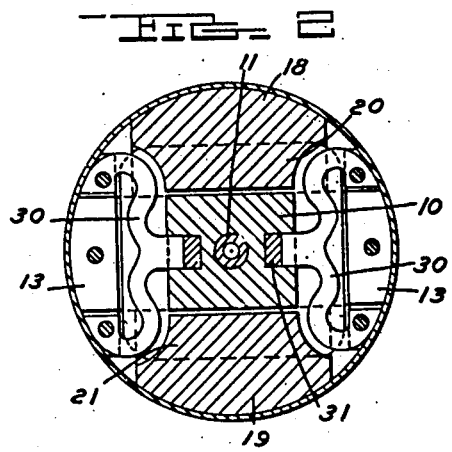

Other objects, features and advantages of the invention will be more fully described in connection with the explanation to be given of the principles of operation of the force motor and a presently preferred constructional embodiment thereof particularly suited for hydraulic servo valve use, all shown in the accompanying drawings which comprise the following views:

Fig. 1, a schematic sectional elevation of the armature and magnetic structure taken along the longitudinal center line of a force motor incorporating the invention;

Fig. 2, a schematic sectional elevation of the structure of Fig. 1 taken at 90° to the plane thereof in order to completely disclose the magnetic structure;

Fig. 3, a sectional elevation of a representative constructional embodiment of the invention, showing a force motor assembly arranged for use in conjunction with the spool of a hydraulic servo valve;

Fig. 4, a side elevation of the force motor assembly portion of the structure of Fig. 3, taken on a plane 90° to the plane of Fig. 3; and Fig. 5, a transverse section through the center of the force motor assembly taken along the line 5—5 of Fig. 4.

Referring first to the schematic views 1 and 2, which together show the complete relationship between an armature and the field structure in which it is mounted, the motor armature is indicated by the reference 10, and consists of a parallelepiped block of material having high permeability. The armature 10 is mounted on a shaft 11. As best shown in Fig. 1, shaft 11 extends through the center of the pole pieces 14 and 15 forming part of two E-section members 12 and 13, respectively. Members 12 and 13 are made of material having high permeability, and their pole pieces 14 and 15 are separated by a gap dimensioned to provide for the width of the armature 10 plus a clearance preferably two to three times greater than the desired amount of armature movement. Control coils 16 and 17 are wound about each of the pole pieces 14 and 15.

Referring to Fig. 2, which is a schematic section taken at 90° to the plane of Fig. 1, the magnetic structure surrounding the armature is completed by two permanent magnet members 18 and 19, having pole pieces 20 and 21, respectively, which are positioned adjacent the side of the armature and adjacent the gap between pole pieces 14 and 15. The magnetic poles of the members 18 and 19 are oriented as shown in the drawing and the size and flux density produced by each member 18 and 19 is identical. Consequently, the effect of the magnetic circuit shown in Fig. 2 is to cause two equal magnetic fluxes to enter the armature from its sides 22 and 23. This flux divides and leaves the armature through its ends 24 and 25 as indicated by the arrows A and B. The total force on the armature in the direction of shaft movement is proportional to $A^2 - B^2$ in the direction of the larger of the fluxes A and B. Normally, this difference is zero. In order to obtain a controllable flux difference to produce a force on the armature in either direction, one of the coils 16 or 17 can be energized, or alternatively the two coils 16 and 17 subjected to a different amount of energizing current. The difference in the fluxes A and B will be proportional to the difference in energizing current and the armature will be subjected to a force toward the pole piece 14 or 15, depending upon the nature of the flux difference.

A centering spring, not shown in Figs. 1 and 2, is incorporated to provide a restoring force on the armature which keeps it normally centered between the pole pieces 14 and 15 when no force is developed by a flux difference. The centering spring permits the armature to be displaced from a centered position in an amount proportional to the force applied to the armature or in other words proportional to the coil differential current, which differential current will be generally termed the control current.

The flux difference $A^2-B^2$ depends upon the displacement of the armature from a centered position as well as upon the control current, but the effect of armature displacement is similar to that of a negative spring. In other words, as the armature is displaced from a centered position, the net result is to produce an additional de-centering force. This effect can be counteracted by employing a centering spring which has a spring constant greater than the equivalent negative spring constant of the armature magnetic circuit to always provide a restoring effect tending to return the armature to a centered position.

The linear characteristic of armature movement in proportion to control current is obtained in this construction by the arrangement of magnetic circuits described. The quiescent flux necessary for good sensitivity is provided by the permanent magnets, whose high incremental reluctance tends to keep the quiescent flux constant independent of armature displacement, while at the same time preventing variation of the reluctance of the path of flux from the two control coils. At the same time, this quiescent flux is obtained from the permanent magnets without the expenditure of power. It should be remembered that a relatively small amount of movement (in the order of .005 to .025 inch), is required for satisfactory operation of a control device of this type in most instances.

A representative construction of a force motor assembly, incorporating the magnetic structure previously described and shown in Figs. 1 and 2, is illustrated in Figs. 3 to 5. Referring to Fig. 3, the armature 10 is shown mounted on a tubular shaft 11 which extends through a hole 27 formed in each of the two E-section field members 12 and 13 and out through the center apertures in an end cap 28, which is positioned adjacent the field member 12, and in an end cap 29 positioned adjacent the field member 13. The armature and shaft are suspended in the holes 27 and apertures, and centered between the poles 14 and 15 by a system of springs which include a pair of leaf springs 30, each positioned between the mating faces of the members 12 and 13 and having their ends connected to the armature by a plug 31, all as clearly shown in Fig. 5. Mounted within the end cap 28 is a spring 34, this spring being positioned against an annular surface 35 formed in the end cap and bearing against a retainer ring 36 which in turn abuts against the end surface of the field member 12. Spring 34 is formed with a central hole through which the shaft 11 extends, and motion of the armature is transmitted to the spring by a spacer tube 37 surrounding the shaft 11 between the armature and spring 34.

A bellows 38 is employed to seal the shaft aperture in the end cap 28. It is soldered to the end cap 28 and to a retainer 39 which has a portion 40 extending around the shaft and contacting the outer surface of the spring 34. This retainer 39 is positioned on the shaft by an end cap 42.

A similar construction is provided for the right-hand end of the assembly as the parts are viewed in Fig. 3. A second spring 44 has its outer circumference clamped between an annular surface 45 on the end cap 29 and a retaining ring 46 which contacts the end of the field member 13. Shaft 11 passes through an aperture in the spring 44, and motion of the armature 10 is transmitted to the spring by a spacer tube 48. A bellows 50 is soldered in sealing relation with the surface of the end cap 29 and with a retainer 51, also having a portion 52 which extends inwardly into contact with the outer surface of the spring 44. The foregoing parts of the spring and bellows system are adjusted in assembled relation by the position of a nut 54 threaded on the end of shaft 11. After assembly, sealing of the parts is completed by soldering the end cap 42 and nut 54 to the shaft and the adjacent retainers 39 and 51, respectively.

The entire assembly is enclosed within a cylindrical casing 56, with a sealing ring 57 being employed between the casing 56 and end cap 28 and a second sealing ring 58 being employed between the casing 56 and end cap 29.

Suitable sealed feed throughs 62 extend through the end cap 29 and are electrically connected by means not shown to establish independent circuits to each of the control coils 16 and 17.

Fig. 4, a side elevation of the complete force motor assembly, shows the manner in which the permanent magnet members 18 and 19 are secured by screws 66 to the field members 12 and 13.

Fig. 3 also illustrates one manner in which a force motor assembly can be used. Included in the view is a phantom showing of one end 70 of a hydraulic servo valve of conventional type having a spool (not shown) whose position is to be governed as a function of the position of the force motor shaft. Valve 70 is formed with an adaptor barrel 71 having an internally threaded end 72. The force motor assembly is mounted within a housing 74 formed with an integral end ring 75 to which the force motor assembly is secured by screws 76 engaging the end cap 28. An externally threaded portion 77 is formed on the housing 74 to engage the internally threaded end 72 of the adaptor barrel 71. Position of the force motor assembly within the adaptor barrel and relative to the spool to be controlled is established as desired by adjusting the threaded engagement between the housing 74 and the adaptor 71. The housing 74 is locked in this position by a ring nut 79. A cap 80, fitted with a suitable electrical connector plug 81 is secured to the end of the housing by screws 82, with a suitable internal sealing ring 83 being employed between these parts.

This illustrates the manner in which the structural and operating characteristics of the force motor are particularly suited for the direct control of a hydraulic valve. The entire unit, particularly the force motor assembly is completely sealed, and the employment of the bellows-type seals at the end of the force motor shaft gives a sealing action which is free from wear due to the abrasive action of moving parts. The force motor assembly is thus good for a long period of reliable service.

High performance characteristics are obtainable from the construction due to the small total gap required for a given amount of maximum linear displacement of the armature, and also due to the fact that the armature construction permits a minimum amount of armature mass for handling a given flux requirement. The armature and its spring system thus have a high natural frequency, highly desirable in servo systems where a fast, accurate response is required.

Other advantages of the construction will be apparent to those skilled in the art as will be possible modifications and deviations from the specific construction disclosed herein by way of example. Such modifications, included within the scope of the following claims, are to be considered a part of the invention.

I claim:

1. A force motor assembly having a field structure and an armature, said field structure including a pair of oppositely disposed pole pieces spaced by a gap, means mounting said armature in said gap for linear movement between said pair of pole pieces, a third pole piece laterally adjacent the gap between said pair of pole pieces, said pole pieces being connected by permeable material in a magnetic circuit such that the air gap between said armature and pair of pole pieces comprises the major portion of the total path reluctance of said circuit, means for applying a quiescent magnetic flux through said armature between said third pole piece and each of said pair of pole pieces, means for producing a difference in flux between said armature and each of said pair of pole pieces whereby a force is applied to said armature in a direction toward one of said pair of pole pieces, and resilient means opposing such force and tending to return said armature to a centered position between said pair of pole pieces whereby armature movement is proportional in direction and magnitude to said force.

2. A force motor according to claim 1 wherein said means for applying a quiescent magnetic flux comprises a permanent magnet whose structure includes said third pole piece, said magnet being oriented so that said third pole piece forms one magnetic pole thereof, the opposite magnetic pole forming part of a magnetic circuit with said pair of pole pieces.

3. A force motor having a field structure including a pair of aligned poles separated by a gap, an armature positioned in said gap and supported for linear movement on a shaft extending through an aperture in each of said pair of pole pieces, a control coil surrounding each of said pair of pole pieces, said field structure providing a magnetic circuit which includes said pair of pole pieces and said armature, said field structure further including means for subjecting said armature to a quiescent magnetic flux from a pole piece positioned intermediate said gap and laterally adjacent said armature and forming part of a second magnetic circuit which includes said armature and said pair of pole pieces, and resilient means opposing motion of said armature whereby such motion is proportional in direction and magnitude to a difference in flux produced by said control coils.

4. A force motor as set forth in claim 3 wherein said means for subjecting said armature to a quiescent flux comprises a pair of permanent magnets each having a common magnetic pole positioned adjacent said gap and laterally adjacent said armature, and a pair of opposite magnetic poles each connected to said field structure to provide a magnetic circuit which includes said armature and each of said pair of poles.

5. A force motor according to claim 3 wherein said resilient means opposing movement of said armature and shaft are arranged to support said armature and shaft for free movement relative to said field structure.

6. A force motor according to claim 5 wherein said resilient means include a spring carried by said field structure and secured to said armature.

7. A force motor assembly including a field structure having a pair of opposed poles separated by a gap, an armature mounted between said pair of poles on a shaft extending through said field structure and beyond each end thereof, and end plates secured to said field structure at each end of said assembly, said shaft extending through said end plates, means supporting said shaft and armature for linear movement, bellows means for establishing a seal between said shaft and each of said end plates, a casing surrounding said magnetic field and engaging said end plates, and means for establishing a seal between said end plates and said casing.

8. A force motor construction according to claim 7 wherein said means for supporting said shaft comprises a pair of springs each carried by one of said end plates and engaging said shaft, and a pair of leaf springs carried by said field structure and engaging said armature.

9. A force motor assembly according to claim 7 wherein said assembly is mounted in a housing having means for being connected in adjustable, sealed relation with a hydraulic valve unit.

10. A force motor structure comprising a pair of field members which are E-shaped in longitudinal section, said members being positioned in face-to-face abutting relation to provide a pair of opposed poles separated by a gap, a central longitudinal bore formed in each of said field members, a shaft extending through said bores, an armature mounted on said shaft and positioned in said gap, a pair of permanent magnets secured to said field members and providing a pair of quiescent flux poles located at opposite sides of said armature, a control coil mounted on each of said pair of opposed poles, resilient means supporting said shaft and normally urging said armature to a centered position between said pair of opposed poles, a cap at each end of said structure, each cap abutting one of said field members and having an aperture through which said shaft passes, a cylindrical casing surrounding said field members and the sides of said caps, means establishing a seal between said caps and said casing, and means for establishing a second seal between said caps and said shaft.

11. A force motor structure according to claim 10 wherein said resilient means supporting said shaft comprises a spring carried by each of said caps, each spring supporting said shaft and being responsive to motion of said armature, and a pair of leaf springs clamped between abutting faces of said field members, said leaf springs each being connected to said armature.

12. A force motor structure comprising a pair of field members which are E-shaped in longitudinal section, said members being positioned in face-to-face abutting relation to provide a pair of opposed poles separated by a gap, a central longitudinal bore formed in each of said field members, a shaft extending through said bores, an armature mounted on said shaft and positioned in said gap, a pair of permanent magnets secured to said field members and providing a pair of quiescent flux poles located at opposite sides of said armature, a control coil mounted on each of said pair of opposed poles, resilient means supporting said shaft and normally urging said armature to a centered position between said pair of opposed poles.

13. A force motor according to claim 1 wherein the magnetic characteristics of the material which forms the magnetic circuits between said pole pieces provide a low reluctance path in the magnetic circuit between said pair of pole pieces and a high reluctance path in the magnetic circuit with said third pole piece.

14. A force motor assembly having a field structure and an armature, said field structure including a pair of oppositely disposed pole pieces spaced by a gap, means movably mounting said armature in said gap, a third pole piece laterally adjacent the gap between said pair of pole pieces, said pole pieces being connected by permeable material in a magnetic circuit, means for applying a quiescent magnetic flux through said armature between said third pole piece and each of said pair of pole pieces, means for producing a difference in flux between said armature and each of said pair of pole pieces whereby a force is applied to said armature in a direction toward one of said pair of pole pieces, and resilient means opposing such force and tending to return said armature to a centered position between said pair of pole pieces whereby armature movement is proportional in direction and magnitude to said force.

15. A force motor assembly having a field structure and an armature; said field structure including a pair of oppositely disposed pole pieces separated by a gap; means movably mounting said armature in said gap; said field structure providing a magnetic circuit which includes said pair of pole pieces and said armature; a third pole piece positioned laterally adjacent the gap between said pair of pole pieces; means for subjecting said armature to a magnetic flux whose magnitude is substantially constant and independent of armature displacement in a second magnetic circuit which includes said armature, said pair of pole pieces and said third pole piece; means for producing a difference in flux between said pair of pole pieces whereby a force is applied to said armature in proportion to such flux difference to produce movement of said armature toward one of said pair of pole pieces; and resilient means opposing such force and tending to return said armature to a centered position between said pair of pole pieces whereby armature movement is proportional in direction and magnitude to said force.

16. A force motor comprising field structure which includes a pair of poles separated by a gap, a bore formed through said field structure and the said pair of poles thereof, a shaft extending through said bore, an armature mounted on said shaft and positioned in said gap, at least one permanent magnet forming part of said field structure and providing a quiescent flux pole located laterally of said armature and shaft, a control coil mounted on each of said pair of poles, and resilient means supporting said shaft and normally urging said armature to a centered position between said pair of poles.

17. A force motor comprising field structure which includes a pair of poles separated by a gap, an armature, means supporting said armature in said gap for back and forth movement between said pair of poles, at least one permanent magnet forming part of said field structure providing a quiescent flux pole located laterally of said armature and its path of movement, a control coil mounted on each of said pair of poles, and resilient means opposing movement of said armature.

References Cited in the file of this patent

UNITED STATES PATENTS

| | | |
|---|---|---|
| 792,692 | Buell | June 20, 1905 |
| 840,987 | Athearn | Jan. 8, 1907 |
| 2,446,855 | Seibel | Aug. 10, 1948 |
| 2,589,024 | Peter | Mar. 11, 1952 |
| 2,690,529 | Lindblad | Sept. 28, 1954 |
| 2,768,359 | Side | Oct. 23, 1956 |